United States Patent
Yang et al.

(10) Patent No.: US 11,481,574 B2
(45) Date of Patent: Oct. 25, 2022

(54) IMAGE PROCESSING METHOD AND DEVICE, AND STORAGE MEDIUM

(71) Applicant: Beijing Sensetime Technology Development Co., Ltd., Beijing (CN)

(72) Inventors: Kunlin Yang, Beijing (CN); Jun Hou, Beijing (CN); Xiaocong Cai, Beijing (CN); Shuai Yi, Beijing (CN)

(73) Assignee: Beijing Sensetime Technology Development Co., Ltd., Beijing (CN)

(*) Notice: Subject to any disclaimer, the term of this patent is extended or adjusted under 35 U.S.C. 154(b) by 60 days.

(21) Appl. No.: 17/002,164

(22) Filed: Aug. 25, 2020

(65) Prior Publication Data

US 2021/0019560 A1 Jan. 21, 2021

Related U.S. Application Data

(63) Continuation of application No. PCT/CN2019/116617, filed on Nov. 8, 2019.

(30) Foreign Application Priority Data

Jul. 18, 2019 (CN) .......................... 201910652025.2

(51) Int. Cl.
*G06K 9/62* (2022.01)
*G06V 10/32* (2022.01)

(52) U.S. Cl.
CPC ......... *G06K 9/6232* (2013.01); *G06K 9/6256* (2013.01); *G06K 9/6268* (2013.01); *G06V 10/32* (2022.01)

(58) Field of Classification Search
CPC .................................................... G06K 9/629
See application file for complete search history.

(56) References Cited

U.S. PATENT DOCUMENTS

2021/0350168 A1* 11/2021 Tian .................. G06K 9/46

FOREIGN PATENT DOCUMENTS

| CN | 103226831 A | 7/2013 |
| CN | 105631880 A * | 6/2016 |

(Continued)

OTHER PUBLICATIONS

Sun et al.; "High-Resolution for Labeling Pixels and Regions"; Computer Vision and Pattern Recognition; Apr. 2019; 13 pages.

(Continued)

*Primary Examiner* — Ross Varndell
(74) *Attorney, Agent, or Firm* — BakerHostetler

(57) ABSTRACT

The present disclosure relates to an image processing method and device, an electronic apparatus and a storage medium. The method comprises: performing feature extraction on an image to be processed to obtain a first feature map of the image to be processed; splitting the first feature map into a plurality of first sub-feature maps according to dimension information of the first feature map and a preset splitting rule, wherein the dimension information of the first feature map comprises dimensions of the first feature map and size of each dimension; performing normalization on the plurality of first sub-feature maps respectively to obtain a plurality of second sub-feature maps; and splicing the plurality of second sub-feature maps to obtain a second feature map of the image to be processed. Embodiments of the present disclosure can reduce the statistical errors during normalization of a complete feature map.

20 Claims, 4 Drawing Sheets

(56) References Cited

FOREIGN PATENT DOCUMENTS

| | | |
|---|---|---|
| CN | 105631880 A | 6/2016 |
| CN | 106599883 A | 4/2017 |
| CN | 108229531 A | 6/2018 |
| CN | 108594997 A | 9/2018 |
| CN | 108596070 A | 9/2018 |
| CN | 108960053 A | 12/2018 |
| CN | 109409518 A | 3/2019 |
| CN | 109711413 A | 5/2019 |
| CN | 109711463 A | 5/2019 |
| CN | 109727216 A | 5/2019 |
| CN | 109740686 A | 5/2019 |
| CN | 109919245 A | 6/2019 |
| CN | 109934241 A | 6/2019 |
| CN | 109948526 A | 6/2019 |
| CN | 109978069 A | 7/2019 |
| CN | 110348537 A | 10/2019 |
| TW | 201909112 A | 3/2019 |

OTHER PUBLICATIONS

Sun et al.; "Deep High-Resolution Representation Learning for Human Pose Estimation"; IEEE/CVF Conf. on Computer Vision and Pattern Recognition; 2019; p. 5693-5703.

\* cited by examiner

IMAGE PROCESSING METHOD AND DEVICE, AND STORAGE MEDIUM

The present application is a bypass continuation of and claims priority under 35 U.S.C. § 111(a) to PCT Application. No. PCT/CN2019/116617, filed on Nov. 8, 2019, which claims priority of Chinese Patent Application No. 201910652025.2 with the title of "Image Processing Method and Device, Electronic Apparatus and Storage Medium", filed on Jul. 18, 2019 with CNIPA, the entire contents of which are incorporated herein by reference.

TECHNICAL FIELD

The present disclosure relates to the technical field of computers, in particular to an image processing method and device, an electronic apparatus and a storage medium.

BACKGROUND

In the deep learning network, the input feature map can be normalized from a fixed dimension, which can not only accelerate the convergence rate of the model, but also alleviate the "Vanishing Gradient" problem in the deep network, thus making it easier to train the deep neural network and get a more stable network.

SUMMARY

The present disclosure provides a technical solution of image processing.

According to one aspect of the present disclosure, there is provided an image processing method, which comprises: performing feature extraction on an image to be processed to obtain a first feature map of the image to be processed; splitting the first feature map into a plurality of first sub-feature maps according to dimension information of the first feature map and a preset splitting rule, wherein the dimension information of the first feature map includes dimensions of the first feature map and size of each dimension; performing normalization on the plurality of first sub-feature maps respectively to obtain a plurality of second sub-feature maps; and splicing the plurality of second sub-feature maps to obtain a second feature map of the image to be processed.

In a possible implementation, splitting the first feature map into the plurality of first sub-feature maps according to the dimension information of the first feature map and the preset splitting rule comprises: splitting the first feature map in spatial dimensions according to the sizes of the spatial dimensions of the first feature map and the preset splitting rule to obtain the plurality of first sub-feature maps.

In a possible implementation, performing normalization on the plurality of first sub-feature maps respectively to obtain the plurality of second sub-feature maps comprises: grouping each first sub-feature map in a channel dimension and performing normalization on each channel of the first sub-feature maps respectively, to obtain a second sub-feature map of the first sub-feature map.

In a possible implementation, splicing the plurality of second sub-feature maps to obtain the second feature map of the image to be processed comprises: splicing the plurality of second sub-feature maps according to the positions of the plurality of first sub-feature maps in the first feature map to obtain the second feature map of the image to be processed.

In a possible implementation, the splitting rule comprises at least one of the following: the dimensions to be split of the feature map, the splitting position of each dimension to be split, the splitting number of each dimension to be split, the splitting size of each dimension to be split, and the number of the split sub-feature maps.

In a possible implementation, the method further comprises the following steps of: performing scale reduction and multi-scale fusion on at least one second feature map of the image to be processed to obtain a plurality of encoded feature maps, wherein the scales of respective feature maps in the plurality of encoded feature maps are different; and performing scale amplification and multi-scale fusion on the plurality of encoded feature maps to obtain a classification prediction result of the image to be processed.

In a possible implementation, performing scale reduction and multi-scale fusion on the at least one second feature map of the image to be processed to obtain the plurality of encoded feature maps comprises the following steps of: performing scale reduction on m second feature maps to obtain m scaled-down feature maps, wherein m is a positive integer; performing feature fusion on the m scaled-down feature maps to obtain an (m+1)th feature map, wherein the scales of the m scaled-down feature maps are equal to that of the (m+1)th feature map; and performing feature optimization and fusion on the m second feature maps and the (m+1)th feature map respectively to obtain m+1 encoded feature maps.

In a possible implementation, performing scale amplification and multi-scale fusion on the plurality of encoded feature maps to obtain the classification prediction result of the image to be processed comprises the following steps of: performing fusion and scale amplification on the m+1 encoded feature maps to obtain m scaled-up feature maps, wherein m is a positive integer; and performing feature optimization and fusion on the m scaled-up feature maps to obtain the classification prediction result of the image to be processed.

In a possible implementation, the method is implemented by a neural network, which comprises a feature extraction network, an encoding network and a decoding network, wherein the feature extraction network is used for feature extraction on the image to be processed, the encoding network is used for performing scale reduction and multi-scale fusion on the at least one second feature map of the image to be processed, and the decoding network is used for performing scale amplification and multi-scale fusion on the plurality of encoded feature maps.

In a possible implementation, the method further comprises: training the neural network according to a preset training set, wherein the training set comprises a plurality of labeled sample images.

According to another aspect of the present disclosure, there is provided an image processing device, comprising: a feature extraction module configured to perform feature extraction on an image to be processed to obtain a first feature map of the image to be processed; a splitting module configured to split the first feature map into a plurality of first sub-feature maps according to dimension information of the first feature map and a preset splitting rule, wherein the dimension information of the first feature map includes dimensions of the first feature map and size of each dimension; a normalization module configured to perform normalization on the plurality of first sub-feature maps respectively to obtain a plurality of second sub-feature maps; and a splicing module configured to splice the plurality of second sub-feature maps to obtain a second feature map of the image to be processed.

In a possible implementation, the splitting module comprises: a splitting submodule configured to split the first feature map in the spatial dimensions according to the sizes of the spatial dimensions of the first feature map and a preset splitting rule to obtain the plurality of first sub-feature maps.

In a possible implementation, the normalization module comprises: a normalization submodule configured to group each first sub-feature map in a channel dimension, and perform normalization on each group of channels of the first sub-feature map respectively to obtain a second sub-feature map of the first sub-feature map.

In a possible implementation, the splicing module comprises: a splicing submodule configured to splice the plurality of second sub-feature maps according to the positions of the plurality of first sub-feature maps in the first feature map to obtain the second feature map of the image to be processed.

In a possible implementation, the splitting rule comprises at least one of the following: the dimensions to be split of the feature map, the splitting position of each dimension to be split, the splitting number of each dimension to be split, the splitting size of each dimension to be split, and the number of the split sub-feature maps.

In a possible implementation, the device further comprises: an encoding module configured to perform scale reduction and multi-scale fusion on at least one second feature map of the image to be processed to obtain a plurality of encoded feature maps, wherein the respective encoded feature maps in the plurality of encoded feature maps have different scales; and a decoding module configured to perform scale amplification and multi-scale fusion on the plurality of encoded feature maps to obtain a classification prediction result of the image to be processed.

In a possible implementation, the encoding module comprises: a reduction submodule configured to perform scale reduction on m second feature maps to obtain m scaled-down feature maps, m being a positive integer; a first fusion submodule configured to perform feature fusion on the m scaled-down feature maps to obtain an (m+1)th feature map, the scales of the m scaled-down feature maps being equal to the scale of the (m+1)th feature map; and a second fusion submodule configured to perform feature optimization and fusion on the m second feature maps and the (m+1)th feature map respectively to obtain m+1 encoded feature maps.

In a possible implementation, the decoding module comprises: an amplification submodule configured to perform fusion and scale amplification on the m+1 encoded feature maps to obtain m scaled-up feature maps, m being a positive integer; and a third fusion submodule configured to perform feature optimization and fusion on the m scaled-up feature maps to obtain the classification prediction result of the image to be processed.

In a possible implementation, the device is implemented by a neural network which comprises a feature extraction network, an encoding network and a decoding network, wherein the feature extraction network is used for feature extraction on the image to be processed, the encoding network is used for scale reduction and multi-scale fusion on the at least one second feature map of the image to be processed, and the decoding network is used for scale amplification and multi-scale fusion on the plurality of encoded feature maps.

In a possible implementation, the device further comprises a training module configured to train the neural network according to a preset training set, wherein the training set comprises a plurality of labeled sample images.

According to another aspect of the present disclosure, there is provided an electronic apparatus comprising: a processor; and a memory for storing processor executable instructions, wherein the processor is configured to invoke instructions stored in the memory to execute the above methods.

According to another aspect of the present disclosure, there is provided a computer readable storage medium having computer program instructions stored thereon, wherein when the computer program instructions are executed by a processor, the above methods are implemented.

According to another aspect of the present disclosure, there is provided a computer program including computer readable code, wherein when the computer readable code is run in an electronic apparatus, a processor in the electronic apparatus executes the above methods.

In an embodiment of the present disclosure, a feature map can be split and then normalized respectively to obtain a plurality of normalized sub-feature maps, and the plurality of normalized sub-feature maps are spliced into a complete feature map, thereby retaining local feature information, reducing statistical errors during normalization of the complete feature map, and improving the validity of extracted features.

It should be understood that the above general description and the following detailed description only serve an exemplary and explanatory purpose, and are not intended to limit the present disclosure. Other features and aspects of the present disclosure will become evident from the following detailed description of the exemplary embodiments with reference to the accompanying drawings.

BRIEF DESCRIPTION OF THE DRAWINGS

The drawings below are incorporated into the specification and constitute a part of the specification. The drawings illustrate embodiments in accordance with the present disclosure and together with the specification are used to explain the technical solutions of the present disclosure.

DETAILED DESCRIPTION OF THE EMBODIMENTS

Figure 1:
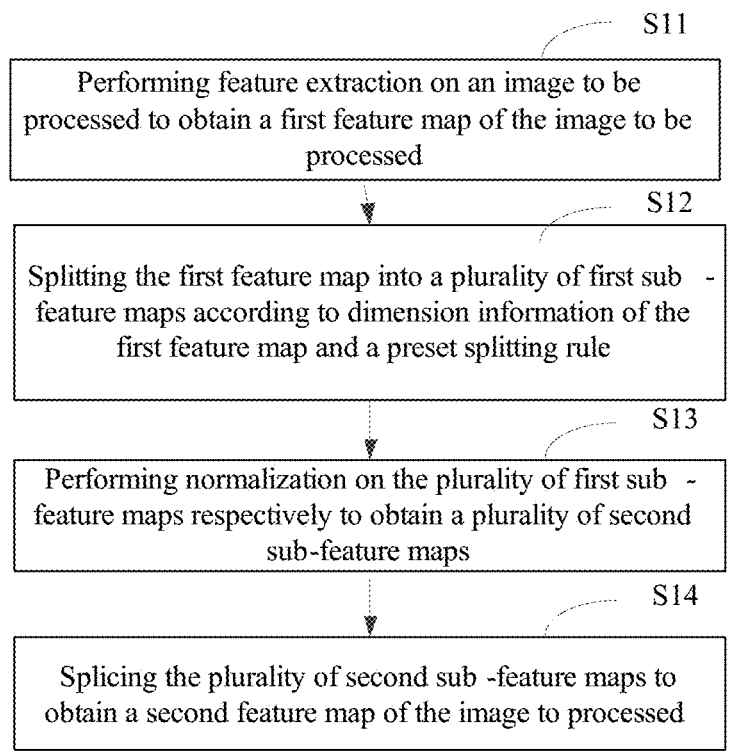
FIG. 1 shows a flowchart of an image processing method according to an embodiment of the present disclosure.

Hereinafter, various exemplary embodiments, features and aspects of the present disclosure will be described in detail with reference to the drawings. In the drawings, the same reference numerals denote elements with the same or similar functions. Although various aspects of embodiments are shown in the drawings, the drawings are not necessarily drawn to scale unless otherwise specified particularly.

The special word "exemplary" here means "serving as an example, embodiment or illustration". Any embodiment described herein as "exemplary" shall not be interpreted as superior or better than other embodiments.

The term "and/or" herein merely describes an association relation between the associated objects, indicating that there can be three kinds of relations. For example, A and/or B can mean three conditions which are A exists alone, A and B exist at the same time, and B exists alone. In addition, the term "at least one" herein means any one of many or any combination of at least two of many. For example, including at least one of A, B and C can mean including any one or more elements selected from a set consisting of A, B and C.

In addition, in order to better illustrate the present disclosure, numerous specific details are given in the following detailed description of embodiments. It should be understood by one skilled in the art that the present disclosure can be implemented without certain specific details. In some embodiments, methods, means, elements and circuits well known to one skilled in the art are not described in detail in order to highlight the main idea of the present disclosure.

FIG. 1 shows a flowchart of an image processing method according to an embodiment of the present disclosure. As shown in FIG. 1, the image processing method comprises the following steps:

in step S11, performing feature extraction on an image to be processed to obtain a first feature map of the image to be processed;

in step S12, splitting the first feature map into a plurality of first sub-feature maps according to dimension information of the first feature map and a preset splitting rule, the dimension information of the first feature map including dimensions of the first feature map and size of each dimension;

in step S13, performing normalization on the plurality of first sub-feature maps respectively to obtain a plurality of second sub-feature maps; and in step S14, splicing the plurality of second sub-feature maps to obtain a second feature map of the image to be processed.

In a possible implementation, the image processing method can be executed by electronic apparatus such as terminal apparatus or servers, and the terminal apparatus can be User Equipment (UE), mobile apparatuses, user terminals, terminals, cellular phones, cordless phones, Personal Digital Assistant (PDA), handheld apparatuses, computing apparatuses, vehicle-mounted apparatuses, wearable apparatuses, etc. The method can be implemented by invoking the computer readable instructions stored in the memory by a processor. Alternatively, the method may be executed by a server.

In a possible implementation, the image to be processed may be an image of a monitored area (such as an intersection, a shopping mall, etc.) shot by an image acquisition apparatus (such as a camera), or an image acquired by other means (such as an image downloaded from the internet). A certain number of objects (such as pedestrians, vehicles, customers, etc.) can be included in the image to be processed. The present disclosure does not limit the type of the image to be processed, the acquisition method of the image to be processed, and the type of the object in the image.

In a possible implementation, in step S11, the image to be processed can be subjected to feature extraction through a feature extraction network to obtain the first feature map of the image to be processed. The feature extraction network may include, for example, a convolutional neural network. The present disclosure does not limit the specific network type of the feature extraction network.

In a possible implementation, the first feature map may have dimension information, which includes dimensions of the first feature map and size of each dimension. For example, the first feature map includes three dimensions: height H, width W and channel C, wherein the height H and the width W are spatial dimensions and the channel C is a channel dimension. The sizes of the respective dimensions, such as the height H and the width W both being 256, and the channel C being 16 (i.e., 16 channels), can be expressed as H×W×C=256×256×16. The present disclosure does not limit the number of dimensions of the first feature map and the specific size of each dimension.

In a possible implementation, if there are differences among the respective regions in the image to be processed, for example, the number of objects (pedestrians) in each region being different, directly performing the normalization on the first feature map may lead to statistical errors. In this case, the first feature map can be split, so that it can be normalized by regions to reduce errors.

In a possible implementation, a splitting rule for the feature map can be preset, so that the feature map can be split according to the splitting rule, such as being evenly split into multiple blocks, being split into blocks with specified sizes, and so on. The same splitting rule can be adopted for all feature maps, or different splitting rules can be adopted for different feature maps, which is not restricted by the present disclosure.

In a possible implementation, the splitting rule may include at least one of the following: the dimensions to be split of the feature map, the splitting position of each dimension to be split, the splitting number of each dimension to be split, the splitting size of each dimension to be split, and the number of the split sub-feature maps.

In a possible implementation, the dimension to be split is used to indicate the dimension to be split in the feature map, for example, the height H and width W in the spatial dimensions to be split; the splitting position of each dimension to be split is used to indicate the position of the splitting point for splitting each dimension to be split in the feature map, for example, the splitting position of the height H (size: 256) including 52, 108 and 160, etc.; the splitting number of each dimension to be split is used to indicate the splitting number of each dimension to be split in the feature map, for example, evenly splitting the height H (size: 256) into three blocks; the splitting size of each dimension to be split is used to indicate the splitting size of each dimension to be split in the feature map, for example, the splitting size in the direction of the dimension of the height H (size: 256) being 64; and the number of the split sub-feature maps is used to indicate the number of the sub-feature maps obtained after splitting the feature map; for example, if the number of the sub-feature maps is 9, the feature map can be split into 3 blocks in the direction of the dimension of the height H and in the direction of the dimension of the width W, respectively.

It should be understood that one skilled in the art can set a specific splitting rule and its contents according to actual conditions, which is not restricted by the present disclosure.

In a possible implementation, in step S12, the first feature map can be split into a plurality of first sub-feature maps according to the dimension information of the first feature map and a preset splitting rule. For example, the splitting rule indicates that the dimensions to be split are height H and width W, and the feature map is split into two blocks in the direction of the dimension of the height H and in the direction of the dimension of the width W, respectively, and then the first feature map can be split into four first sub-feature maps (128×128×16).

In a possible implementation, a plurality of first sub-feature maps may be normalized in step S13 to obtain a plurality of second sub-feature maps. The present disclosure does not restrict the specific mode of normalization.

In a possible implementation, a plurality of second sub-feature maps may be spliced in step S14 to obtain a second feature map of the image to be processed. That is, according to the positions of the respective normalized sub-feature maps, a plurality of sub-feature maps are spliced to obtain a complete feature map (the second feature map) for subsequent processing.

According to an embodiment of the present disclosure, a feature map can be split and then normalized respectively to obtain a plurality of normalized sub-feature maps, and the normalized sub-feature maps are spliced into a complete feature map, thereby retaining local feature information, reducing statistical errors during normalization of the complete feature map, and improving the validity of extracted features.

In a possible implementation, step S12 may comprise:
according to the sizes of the spatial dimensions of the first feature map and the preset splitting rule, splitting the first feature map in the spatial dimensions to obtain a plurality of first sub-feature maps.

For example, a preset splitting rule can be set to split the first feature map in the spatial dimensions (H and W), for example, evenly into four blocks in each dimension direction. In this case, according to the size (256×256) of the spatial dimensions (H and W) of the first feature map, the first feature map can be split into 16 first sub-feature maps with a size of 64×64 in the spatial dimensions (H and W). Sizes of other dimensions of each first sub-feature map are the same as those of the first feature map (for example, the numbers of channels are all 16).

In this way, the feature map can be split by regions in the spatial dimensions into sub-feature maps of each spatial region, so that each spatial region of the feature map can be normalized separately, thus reducing the statistical errors when the complete feature map is normalized.

In a possible implementation, step S13 may comprise:
grouping each first sub-feature map in a channel dimension, and normalizing each group of channels of the first sub-feature map respectively to obtain a second sub-feature map of the first sub-feature map.

For example, in the related technologies, data of each batch can be normalized by Batch Normalization (BN). However, with regard to tasks to which a large batch size is impossible to use during training, such as object detection, semantic segmentation and crowd density estimation, the effect of BN is unsatisfying. In this case, the feature map can be normalized by Group Normalization (GN).

In a possible implementation, after a plurality of sub-feature maps are obtained, each first sub-feature map can be grouped in the channel dimension C. For example, the 16 channels of the first sub-feature map can be divided into 2 groups each of which includes 8 channels. And then normalization is performed on each group of channels respectively. That is, an average value and variance of each group of channels in the first sub-feature map are counted respectively, and then a value of each position of each group of channels in the first sub-feature map is normalized to obtain a normalized result (second sub-feature maps of the first sub-feature maps). In this way, a plurality of second sub-feature maps corresponding to the plurality of first sub-feature maps can be obtained. The present disclosure does not restrict the number of the groups of the channels and the number of the channels included in each group.

In this way, each group of channels of the sub-feature maps can be normalized respectively, thereby further reducing the statistical errors during normalization and improving the validity of the extracted features.

In a possible implementation, step S14 may comprise:
according to positions of the plurality of the first sub-feature maps in the first feature map, splicing the plurality of the second sub-feature maps to obtain a second feature map of the image to be processed.

For example, after a plurality of normalized second sub-feature maps are obtained, the positions of the respective first sub-feature maps in the first feature map can be determined as the positions of the respective corresponding second sub-feature maps; that is, the splicing order is the same as the splitting order. The respective second sub-feature maps are spliced according to the positions of the respective second sub-feature maps to obtain a spliced second feature map.

In this way, it can be ensured that the distribution of local feature information of the second feature map is consistent with that of the first feature map.

Figure 2:
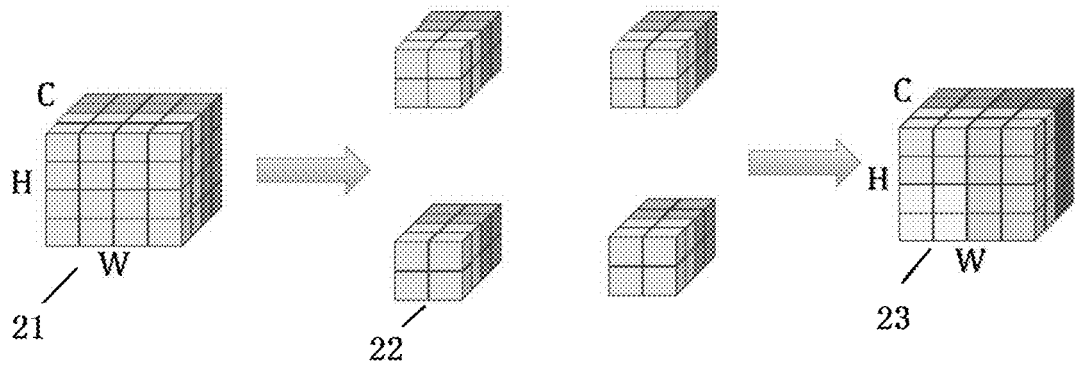
FIG. 2 shows a schematic diagram of a processing procedure of an image processing method according to an embodiment of the present disclosure.

FIG. 2 shows a schematic diagram of a processing procedure of an image processing method according to an embodiment of the present disclosure. As shown in FIG. 2, a first feature map 21 can include three dimensions: height H, width W and channel C; a preset splitting rule can be splitting a target into two blocks in the spatial dimension H and two blocks in the spatial dimension W; according to the dimension information of the first feature map 21 and the splitting rule, the first feature map 21 can be split into four first sub-feature maps 22; and the four first sub-feature maps 22 can be subjected to GN (channel C grouping) respectively, and the obtained results (four second sub-feature maps) are spliced in the splitting order to obtain a complete second feature map 23 for subsequent operations.

In a possible implementation, the method may further comprise:
performing scale reduction and multi-scale fusion on at least one second feature map of the image to be processed to obtain a plurality of encoded feature maps, each of the plurality of encoded features maps having a different scale; and
performing scale amplification and multi-scale fusion on the plurality of encoded feature maps to obtain a classification prediction result of the images to be processed.

For example, the image to be processed can be subjected to feature extraction to obtain a plurality of first feature maps with different scales, and a plurality of second feature maps can be obtained after splitting, normalization and splicing in steps S12-S14. In the subsequent processing, scale reduction and multi-scale fusion can be performed on at least one second feature map of the image to be processed through an encoding network of a neural network to obtain a plurality of encoded feature maps, each of which has a different scale. In this way, the global information and the local information can be fused at each scale, and thus the validity of the extracted features can be improved.

In a possible implementation, the encoding network may include, for example, a convolution layer, a residual layer, an upsampling layer, a fusion layer, and the like. The second feature map can be scaled down by a first convolution layer (step size>1) of the encoding network to obtain a scaled-down feature map. Feature optimization is performed on the second feature map and the scaled-down feature map by a second convolution layer (step size=1) and/or the residual layer to obtain a plurality of feature-optimized feature maps; Then, the plurality of feature-optimized feature maps are fused by the upsampling layer, convolution layer (step size>1) and/or fusion layer of the encoding network to obtain a plurality of encoded feature maps.

In a possible implementation, after a plurality of encoded feature maps are obtained, the plurality of encoded feature maps can be subjected to scale amplification and multi-scale fusion by a decoding network to obtain a classification prediction result of the image to be processed.

In a possible implementation, the decoding network may include, for example, a fusion layer, a deconvolution layer, a convolution layer, a residual layer, an upsampling layer, and the like. The plurality of encoded feature maps can be fused by the fusion layer of the decoding network to obtain a plurality of fused feature maps. Scale amplification is performed on the plurality of fused feature maps by the deconvolution layer to obtain a plurality of scaled-up feature maps. The plurality of feature maps are fused and optimized by the fusion layer, convolution layer (step size=1) and/or residual layer, etc. respectively, to obtain decoded feature maps (classification prediction result). The present disclosure does not limit the specific network structure of the encoding network and the decoding network.

In a possible implementation, the splitting, normalization and splicing in steps S12-S14 can be performed after any network layer (fusion layer, deconvolution layer, convolution layer, residual layer, upsampling layer, etc.) of the encoding network and decoding network, so as to normalize the operation results of the respective network layers to improve the robustness of the operation results of the network layers.

In this way, the feature maps of the image can be scaled down and fused at multiple scales through the encoding network, and the plurality of encoded feature maps can be scaled up and fused at multiple scales through the decoding network, thus fusing multi-scale global information and local information for many times in the encoding and decoding process, retaining more effective multi-scale information and improving the quality and robustness of the prediction result.

In a possible implementation, the step of performing scale reduction and multi-scale fusion on at least one second feature map of the image to be processed to obtain a plurality of encoded feature maps may comprise:

performing scale reduction on m second feature maps to obtain m scaled-down feature maps, m being a positive integer;

performing feature fusion on the m scaled-down feature maps to obtain an (m+1)th feature map, scales of the m scaled-down feature maps being equal to that of the (m+1)th feature map; and performing feature optimization and fusion on the m second feature maps and the (m+1)th feature map respectively to obtain m+1 encoded feature maps.

For example, the number of the second feature maps to be processed can be set to m, m being an arbitrary positive integer. The m second feature maps can be scaled down by m convolution subnetworks of the encoding network (each convolution subnetwork includes at least one first convolution layer) to obtain m scaled-down feature maps. The scales of the m scaled-down feature maps are the same and smaller than the scale of the m-th second feature map (equal to the scale of the (m+1)th feature map). The m scaled-down feature maps are fused in features by a fusion layer to obtain an (m+1)th feature map.

In a possible implementation, each convolution subnetwork includes at least one first convolution layer which is used to scale down the feature map, a size of a convolution kernel of the first convolution layer is 3×3, and a step size of the first convolution layer is 2. The number of the first convolution layers of the convolution subnetwork is related to the scales of the corresponding feature maps. For example, the first encoded second feature map has a scale of 4× (width and height are respectively ¼ of the image to be processed), while the m feature maps to be generated have a scale of 16× (width and height are respectively 1/16 of the image to be processed), so the first convolution subnetwork includes two first convolution layers. It should be understood that one skilled in the art can set the number, the size of the convolution kernel and the step size of the first convolution layers of the convolution subnetwork according to the actual condition, which is not limited by the present disclosure.

In a possible implementation, multi-scale fusion can be performed on the m encoded second feature maps by the fusion layer of the encoding network to obtain m fused feature maps. Feature optimization is performed on the m fused feature maps and the m+1th feature map respectively by m+1 feature optimization subnetworks (each feature optimization subnetwork comprises a second convolution layer and/or a residual layer) to obtain m+1 feature-optimized feature maps. Then, the m+1 feature-optimized feature maps are fused at multiple scales through m+1 fusion subnetworks to obtain m+1 encoded feature maps.

In a possible implementation, feature optimization and multi-scale fusion can be performed again on the m+1 feature maps after multi-scale fusion, so as to further improve the validity of the extracted multi-scale features. The present disclosure does not limit the times of the feature optimization and the multi-scale fusion.

In a possible implementation, the feature map can be optimized directly by the second convolution layer, wherein the size of the convolution kernel of the second convolution layer is 3×3 and the step size of the second convolution layer is 1. The feature map can also be optimized by a basic block composed of the second convolution layer and the residual layer. This basic block can be used as a basic unit of optimization, and each basic block can comprise two continuous second convolution layers. Then the input feature map and the feature map obtained from convolution are added by the residual layer to output as a result. The present disclosure does not limit the specific mode of feature optimization.

In one possible implementation, each feature optimization subnetwork may include at least one basic block. Feature optimization can be performed on the m second feature maps and the (m+1)th feature map respectively by the basic blocks of each feature optimization subnetwork to obtain m+1 feature-optimized feature maps. It should be understood that one skilled in the art can set the number and the size of the convolution kernel of the second convolution layers according to the actual condition, which is not limited by the present disclosure.

In this way, the validity of the extracted multi-scale features can be further improved.

In a possible implementation, m+1 fusion subnetworks of the encoding network can fuse the m+1 feature-optimized feature maps, respectively. For the k-th fusion subnetwork of the m+1 fusion subnetworks (k is an integer and 1≤k≤m+1), the k-th fusion subnetwork can first adjust the scales of the m+1 feature maps to the scale of the k-th feature-optimized feature map. Under the condition of 1<k<m+1, the scales of k−1 feature maps prior to the k-th feature-optimized feature map are larger than the scale of the k-th feature-optimized feature map; for example, if the scale of the k-th feature map is 16× (width and height are respectively 1/16 of the image to be processed), the scales of the feature maps prior to the k-th feature map are 4× and 8×. In this case, the k−1 feature maps, the scales of which are larger than that of the k-th feature-optimized feature map, can be subjected to scale reduction by at least one first convolution layer to obtain k−1 scaled-down feature maps. That is, the feature maps with scales of 4× and 8× can be all reduced to feature maps with a scale of 16× by scaling down the feature map with a scale of 4× by two first convolution layers, and scaling down the feature map with a scale of 8× by one first convolution layer. In this way, k−1 scaled-down feature maps can be obtained.

In a possible implementation, when 1<k<m+, the scales of m+1−k feature maps after the k-th feature-optimized feature map are all smaller than the scale of the k-th feature-optimized feature map. For example, if the scale of the k-th feature map is 16× (width and height are respectively 1/16 of the image to be processed), the m+1−k feature maps after the k-th feature map have a scale of 32×. In this case, the feature maps with the scale of 32× can be scaled up by the upsampling layer, and the third convolution layer (convolution kernel size: 1×1) adjusts the channels of the scaled-up feature maps, such that the channel number of the scaled-up feature maps is the same as that of the k-th feature map, thus obtaining feature maps with a scale of 16×. In this way, m+1-k scaled-up feature maps can be obtained.

In a possible implementation, when k=1, the scales of the m feature maps after the first feature-optimized feature map are all smaller than the scale of the first feature-optimized feature map, so scale amplification and channel adjustment can be performed on the m feature maps after the first feature-optimized feature map to obtain m scaled-up feature maps after the first feature-optimized feature map. When k=m+1, the scales of m feature maps prior to the (m+1)th feature-optimized feature map are all larger than the scale of the (m+1)th feature-optimized feature map, so the m feature maps prior to the (m+1)th feature-optimized feature map can be scaled down to obtain m scaled-down feature maps prior to the (m+1)th feature-optimized feature map.

In a possible implementation, the k-th fusion subnetwork can fuse the m+1 scale-adjusted feature maps. When 1<k<m+, the m+1 scale-adjusted feature maps include k−1 scaled-down feature maps, the k-th feature-optimized feature map and m+1−k scaled-up feature maps. The k−1 scaled-down feature maps, the k-th feature-optimized feature map and the m+1−k scaled-up feature maps can be fused (added) to obtain a k-th encoded feature map.

In a possible implementation, when k=1, the m+1 scale-adjusted feature maps include the first feature-optimized feature map and the m scaled-up feature maps. The first feature-optimized feature map and the m scaled-up feature maps can be fused (added) to obtain a first encoded feature map.

In a possible implementation, when k=m+1, the m+1 scale-adjusted feature maps include the m scaled-down feature maps and the (m+1)th feature-optimized feature map. The m scaled-down feature maps and the (m+1)th feature-optimized feature map can be fused (added) to obtain an (m+1)th encoded feature map.

Figures 3A, 3B, 3C:
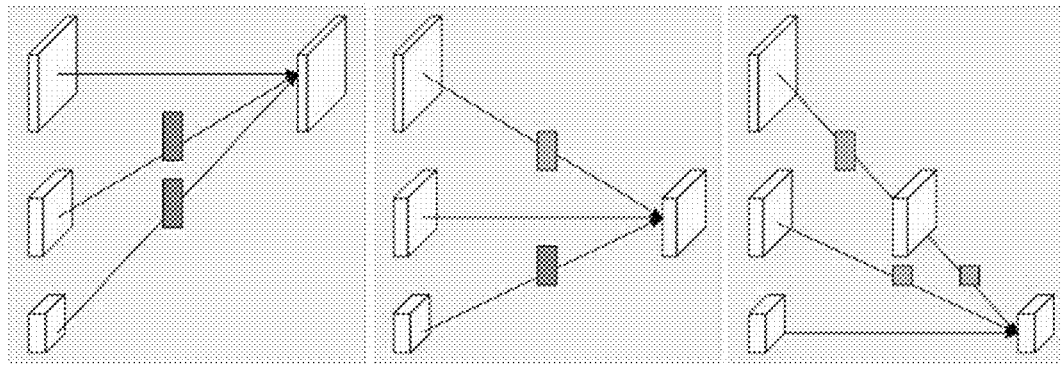
FIGS. 3a, 3b and 3c show schematic diagrams of a multi-scale fusion process of an image processing method according to an embodiment of the present disclosure.

FIGS. 3a, 3b, and 3c show schematic diagrams of a multi-scale fusion process of an image processing method according to an embodiment of the present disclosure. In FIGS. 3a, 3b, and 3c, three feature maps to be fused are taken as an example for explanation.

As shown in FIG. 3a, when k=1, scale amplification (upsampling) and channel adjustment (1×1 convolution) can be performed on the second and third feature maps, respectively, to obtain two feature maps with the same scale and channel number as the first feature map, and then these three feature maps are added to obtain a fused feature map.

As shown in FIG. 3b, when k=2, scale reduction (convolution with a convolution kernel size of 3×3 and a step size of 2) can be performed on the first feature map, and scale amplification (upsampling) and channel adjustment (1×1 convolution) are performed on the third feature map, so as to obtain two feature maps with the same scale and channel number as the second feature map, and then these three feature maps are added to obtain a fused feature map.

As shown in FIG. 3c, when k=3, scale reduction (convolution with a convolution kernel size of 3×3 and a step size of 2) can be performed on the first and second feature maps. Because there is a 4-time scale difference between the first feature map and the third feature map, two convolutions (convolution kernel size: 3×3, step size: 2) can be performed. After scale reduction, two feature maps with the same scale and channel number as the third feature map can be obtained, and then these three feature maps are added to obtain a fused feature map.

In this way, multi-scale fusion between multiple feature maps with different scales can be realized, and global and local information can be fused at each scale to extract more valid multi-scale features.

In a possible implementation, the step of performing scale amplification and multi-scale fusion on the plurality of encoded feature maps to obtain a classification prediction result of the image to be processed may comprise:

performing fusion and scale amplification on m+1 encoded feature maps to obtain m scaled-up feature maps, m being a positive integer; and performing feature optimization and fusion on the m scaled-up feature maps to obtain the classification prediction result of the image to be processed.

For example, the encoded m+1 feature maps can be fused first, so as to reduce the number of the feature maps while fusing multi-scale information. M first fused subnetworks corresponding to the first m feature maps among the m+1 encoded feature maps can be provided. For example, if the feature maps to be fused include four feature maps with the scales of 4×, 8×, 16× and 32×, three first fusion subnetworks can be provided to perform fusion to obtain three feature maps with the scales of 4×, 8× and 16×.

In a possible implementation, the network structure of the m first fusion subnetworks of the decoding network can be similar to that of the fusion subnetworks of the encoding network. For example, for the q-th first fusion subnetwork (1≤q≤m), the q-th first fusion subnetwork can first adjust the scales of the m+1 feature maps to the scale of the q-th decoded feature map, and then fuse the scale-adjusted m+1 feature maps to obtain a q-th fused feature map. In this way, m fused feature maps can be obtained. The detailed process of scale adjustment and fusion will not be repeated here.

In a possible implementation, the m fused feature maps can be scaled up respectively by a deconvolution subnetwork of the decoding network. For example, three fused feature maps with scales of 4×, 8× and 16× can be scaled up into three feature maps with scales of 2×, 4× and 8×. After the scale amplification, m scaled-up feature maps are obtained.

In a possible implementation, after the m scaled-up feature maps are obtained, scale adjustment and fusion can be performed on the m feature maps by m second fusion subnetworks respectively to obtain m fused feature maps. The detailed process of scale adjustment and fusion will not be repeated here.

In a possible implementation, the m fused feature maps can be optimized by a feature optimization subnetwork of the decoding network, and each feature optimization subnetwork can include at least one basic block. After feature optimization, m decoded feature maps can be obtained. The detailed process of feature optimization will not be repeated here.

In a possible implementation, the multi-scale fusion process and the feature optimization process of the decoding network can be repeated many times to further fuse global and local features of different scales. The present disclosure does not limit the time of the multi-scale fusion process and the feature optimization process.

In a possible implementation, the fusion process and the scale amplification process of the decoding network can be repeated many times to obtain a target feature map with the same scale as the image to be processed; and then the target feature map is optimized to obtain a predicted density map of the image to be processed.

In a possible implementation, the predicted density map can be directly used as the prediction result of the image to be processed; or the predicted density map can also be further processed (for example, by a softmax layer, etc.) to obtain a classification prediction result of the image to be processed.

In this way, the decoding network fuses the global information and the local information many times during the scale amplification process, which improves the quality of the prediction result.

In a possible implementation, the image processing method according to the present disclosure can be realized by a neural network which includes a feature extraction network, an encoding network and a decoding network. The feature extraction network is used for performing feature extraction on the image to be processed, the encoding network is used for performing scale reduction and multi-scale fusion on at least one second feature map of the image to be processed, and the decoding network is used for performing scale amplification and multi-scale fusion on the plurality of encoded feature maps. Since the processing procedures of the feature extraction network, the encoding network and the decoding network have already been explained in the foregoing, they will not be repeated here.

In a possible implementation, the neural network of the present disclosure may be trained before being applied. The image processing method according to an embodiment of the present disclosure further comprises:

training the neural network according to a preset training set, wherein the training set comprises a plurality of labeled sample images.

For example, a plurality of sample images can be set in advance, and each sample image has annotated information, such as the position and number, etc. of pedestrians in the sample image. A plurality of sample images with annotated information can be combined into a training set to train the neural network.

In a possible implementation, the sample images can be input into the feature extraction network to be processed by the feature extraction network, the encoding network and the decoding network to output prediction results of the sample images. According to the prediction results and the annotated information of the sample images, the network loss of the neural network is determined. The network parameters of the neural network are adjusted according to the network loss. When the preset training conditions are met, a trained neural network can be obtained. The present disclosure does not limit the specific training mode.

In this way, a high-precision neural network can be obtained.

According to the normalization method of the present disclosure, the feature map can be divided by regions in the spatial dimensions, and each spatial region is normalized respectively, so that the local differences of the feature map are retained and the statistical error during normalization of the complete feature map are reduced. According to a embodiment of the present disclosure, the performance of the networks can be guaranteed even when a small batch size is used during training, so the present disclosure can be applied to tasks that can only use the small batch size during training (such as crowd density estimation, semantic segmentation, etc.) to solve problems such as vanishing/exploding gradient caused by not using the normalization layer during training of tasks such as crowd density estimation.

According to the image processing method of the embodiment of the present disclosure, a small-scale feature map can be obtained by a convolution operation with a step size, more valid multi-scale information can be extracted by continuously fusing global and local information in the network structure, and the extraction of current scale information can be promoted by information of other scales, thereby enhancing the robustness of the recognition of the network for multi-scale target (such as pedestrians). It is possible to fuse the multi-scale information while amplifying the feature map in the decoding network, keep the multi-scale information and improve the quality of the generated density map, thus improving the accuracy of model prediction.

The image processing method according to the embodiment of the present disclosure can be applied to application scenarios such as intelligent video analysis, security monitoring, etc., to identify targets (such as pedestrians, vehicles, etc.) in a scene, and predict and to predict the number and distribution etc. of the targets in the scene, so as to analyze the behavior of the crowd in the current scenario.

It can be understood that all the above-mentioned method embodiments of the present disclosure can be combined with each other to form a combined embodiment without violating the principle and logic. Due to the limitation of space, no more details will be given here. One skilled in the art can understand that in the above-mentioned method of the specific embodiments, the specific execution order of the steps should be determined according to their functions and possible internal logic.

In addition, the present disclosure also provides an image processing device, an electronic apparatus, a computer readable storage medium and a program, all of which can be used to implement any image processing method provided by the present disclosure. For the corresponding technical solutions and descriptions, please refer to the above description of the method, and no more details will be given.

Figure 4:
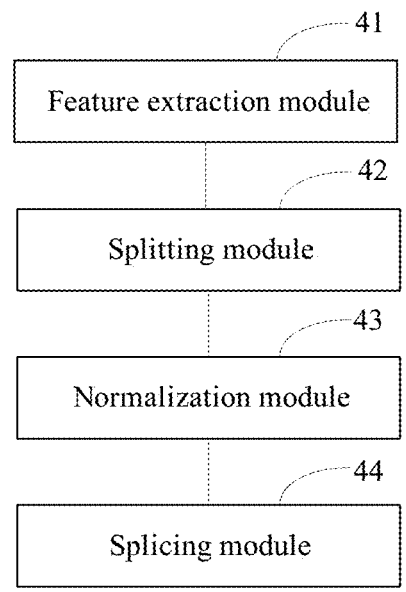
FIG. 4 shows a block diagram of an image processing device according to an embodiment of the present disclosure.

FIG. 4 shows a block diagram of an image processing device according to an embodiment of the present disclosure. As shown in FIG. 4, the image processing device comprises:

a feature extraction module 41, configured to perform feature extraction on an image to be processed to obtain a first feature map of the image to be processed; a splitting module 42, configured to split the first feature map into a plurality of first sub-feature maps according to dimension information of the first feature map and a preset splitting rule, wherein the dimension information of the first feature map includes dimensions of the first feature map and size of each dimension; a normalization module 43, configured to perform normalization on the plurality of first sub-feature maps to obtain a plurality of second sub-feature maps; and a splicing module 44, configured to splice the plurality of second sub-feature maps to obtain a second feature map of the image to be processed.

In a possible implementation, the splitting module comprises a splitting submodule configured to split the first feature map in the spatial dimensions according to the sizes of the spatial dimensions of the first feature map and the preset splitting rule to obtain the plurality of first sub-feature maps.

In a possible implementation, the normalization module comprises a normalization submodule configured to group each first sub-feature map in a channel dimension, and perform normalization on each group of channels of the first sub-feature map respectively to obtain second sub-feature maps of the first sub-feature map.

In a possible implementation, the splicing module includes a splicing submodule configured to splice the plurality of second sub-feature maps according to the positions of the plurality of first sub-feature maps in the first feature map to obtain a second feature map of the image to be processed.

In a possible implementation, the splitting rule comprises at least one of the following: the dimensions to be split of the feature map, the splitting position of each dimension to be split, the splitting number of each dimension to be split, the splitting size of each dimension to be split, and the number of the split sub-feature maps.

In a possible implementation, the device further comprises: an encoding module configured to perform scale reduction and multi-scale fusion on at least one second feature map of the image to be processed to obtain a plurality of encoded feature maps, wherein the respective encoded feature maps have different scales; and a decoding module configured to perform scale amplification and multi-scale fusion on the encoded feature maps to obtain a classification prediction result of the image to be processed.

In a possible implementation, the encoding module comprises: a reduction submodule configured to perform scale reduction on m second feature maps to obtain m scaled-down feature maps, m being a positive integer; a first fusion submodule configured to perform feature fusion on the m scaled-down feature maps to obtain an (m+1)th feature map, the scales of the m scaled-down feature maps being equal to the scale of the (m+1)th feature map; and a second fusion submodule configured to perform feature optimization and fusion on the m second feature maps and the (m+1)th feature map respectively to obtain m+1 encoded feature maps.

In a possible implementation, the decoding module comprises: an amplification submodule configured to perform fusion and scale amplification on the m+1 encoded feature maps to obtain m scaled-up feature maps, m being a positive integer; and a third fusion submodule configured to perform feature optimization and fusion on the m scaled-up feature maps, so as to obtain the classification prediction result of the image to be processed.

In a possible implementation, the device is implemented by a neural network which includes a feature extraction network, an encoding network and a decoding network, wherein the feature extraction network is used for performing feature extraction on an image to be processed, the encoding network is used for performing scale reduction and multi-scale fusion on at least one second feature map of the image to be processed, and the decoding network is used for performing scale amplification and multi-scale fusion on the plurality of encoded feature maps.

In a possible implementation, the device further comprises a training module configured to train the neural network according to a preset training set, wherein the training set comprises a plurality of labeled sample images.

In some embodiments, the functions of the device or the modules included in the device provided by the embodiments of the present disclosure can be used to execute the method described in the above method embodiments. The description of the above method embodiments can be referred to for the specific implementation of the functions or the modules, which will not be repeated here for brevity.

The present disclosure also provides a computer readable storage medium having computer program instructions stored thereon, wherein when the computer program instructions are executed by a processor, the above methods are implemented. The computer readable storage medium may be a nonvolatile computer readable storage medium or a volatile computer readable storage medium.

The present disclosure also provides an electronic apparatus comprising a processor and a memory for storing processor executable instructions, wherein the processor is configured to invoke the instructions stored in the memory to execute the above methods.

The present disclosure also provides a computer program including computer readable code, wherein when the computer readable code is run in an electronic apparatus, a processor in the electronic apparatus executes the above methods.

The electronic apparatus can be provided as a terminal, a server or apparatus of other forms.

Figure 5:
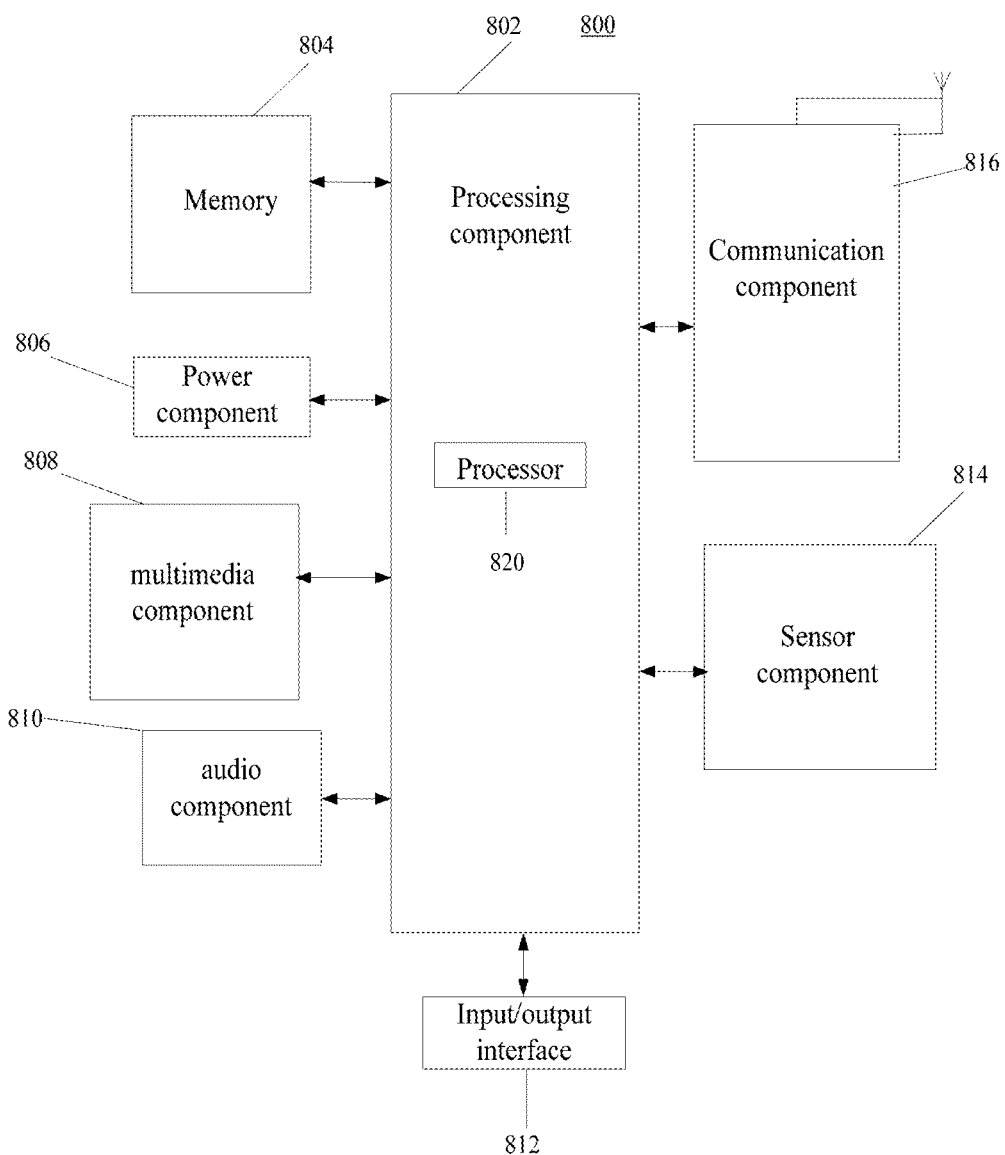
FIG. 5 shows a block diagram of an electronic apparatus according to an embodiment of the present disclosure.

FIG. 5 shows a block diagram of an electronic apparatus 800 according to an embodiment of the present disclosure. For example, the electronic apparatus 800 can be a mobile phone, a computer, a digital broadcasting terminal, a messaging apparatus, a game console, a tablet apparatus, a medical apparatus, a fitness apparatus, a personal digital assistant and the like.

Referring to FIG. 5, the electronic apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operation of the electronic apparatus 800, such as operations associated with display, telephone call, data communication, camera operation and recording operation. The processing component 802 may include one or more processors 820 to execute instructions to complete all or part of the steps of the method described above. In addition, the processing component 802 may include one or more modules to facilitate interaction between the processing component 802 and other components. For example, the processing component 802 can include a multimedia module to facilitate the interaction between the multimedia component 808 and the processing component 802.

The memory 804 is configured to store various types of data to support operations at the electronic apparatus 800. Examples of such data include instruction of any application program or method operated on the electronic apparatus 800, contact data, phone book data, messages, pictures, videos, and the like. The memory 804 may be implemented by any type of volatile or non-volatile storage devices or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 806 provides power to various components of the electronic apparatus 800. The power component 806 may include a power management system, one or more power sources, and other components associated with generating, managing, and distributing power for the electronic apparatus 800.

The multimedia component 808 includes a screen that provides an output interface between the electronic apparatus 800 and a user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense touch, sliding, and gestures on the touch panel. The touch sensor may not only sense the boundary of a touch or a sliding action, but also detect the duration time and pressure related to the touch or the sliding operation. In some embodiments, the multimedia component 808 includes a front camera and/or a rear camera. When the electronic apparatus 800 is in an operation mode, such as a shooting mode or a video mode, the front camera and/or the rear camera can receive external multimedia data. Each front camera and rear camera may be a fixed optical lens system or have focal length and optical zoom capability.

The audio component 810 is configured to output and/or input audio signals. For example, the audio component 810 includes a microphone (MIC) configured to receive external audio signals when the electronic apparatus 800 is in an operation mode, such as a call mode, a recording mode and a voice recognition mode. The received audio signals may be further stored in the memory 804 or transmitted via the communication component 816. In some embodiments, the audio component 810 further includes a speaker for outputting audio signals.

The I/O interface 812 provides an interface between the processing component 802 and a peripheral interface module which may be keyboard, click wheel, button, etc. The button may include but is not limited to a home button, a volume button, a start button, and a lock button.

The sensor component 814 includes one or more sensors for providing status assessment of various aspects of the electronic apparatus 800. For example, the sensor component 814 can detect the on/off state of the electronic apparatus 800, the relative positioning of the components which are for example a display and a keypad of the electronic apparatus 800, the position change of the electronic apparatus 800 or a component of the electronic apparatus 800, the presence or absence of contact between the user and the electronic apparatus 800, the orientation or acceleration/deceleration of the electronic apparatus 800 and the temperature change of the electronic apparatus 800. The sensor component 814 may include a proximity sensor configured to detect the presence of nearby objects without any physical contact. The sensor component 814 may also include an optical sensor, such as a CMOS or CCD image sensor, for use in imaging applications. In some embodiments, the sensor component 814 may also include an acceleration sensor, a gyro sensor, a magnetic sensor, a pressure sensor or a temperature sensor.

The communication component 816 is configured to facilitate wired or wireless communication between electronic apparatus 800 and other apparatuses. The electronic apparatus 800 can access a wireless network based on a communication standard, such as WiFi, 2G or 3G, or a combination thereof. In an exemplary embodiment, the communication component 816 receives a broadcast signal from an external broadcast management system or broadcasts related information via a broadcast channel. In an exemplary embodiment, the communication component 816 further includes a near field communication (NFC) module to facilitate short-range communication. For example, the NFC module can be implemented based on Radio Frequency Identification (RFID) technology, Infrared Data Association (IrDA) technology, Ultra Wideband (UWB) technology, Bluetooth (BT) technology and other technologies.

In an exemplary embodiment, the electronic apparatus 800 may be implemented by one or more application specific integrated circuits (ASIC), digital signal processors (DSPs), digital signal processing devices (DSPD), programmable logic devices (PLD), field programmable gate arrays (FPGA), controllers, microcontrollers, microprocessors or other electronic components, for performing the above methods.

In an exemplary embodiment, a non-volatile computer readable storage medium, such as the memory 804 including computer program instructions, is also provided. The computer program instructions can be executed by the processor 820 of the electronic apparatus 800 to complete the above methods.

Figure 6:
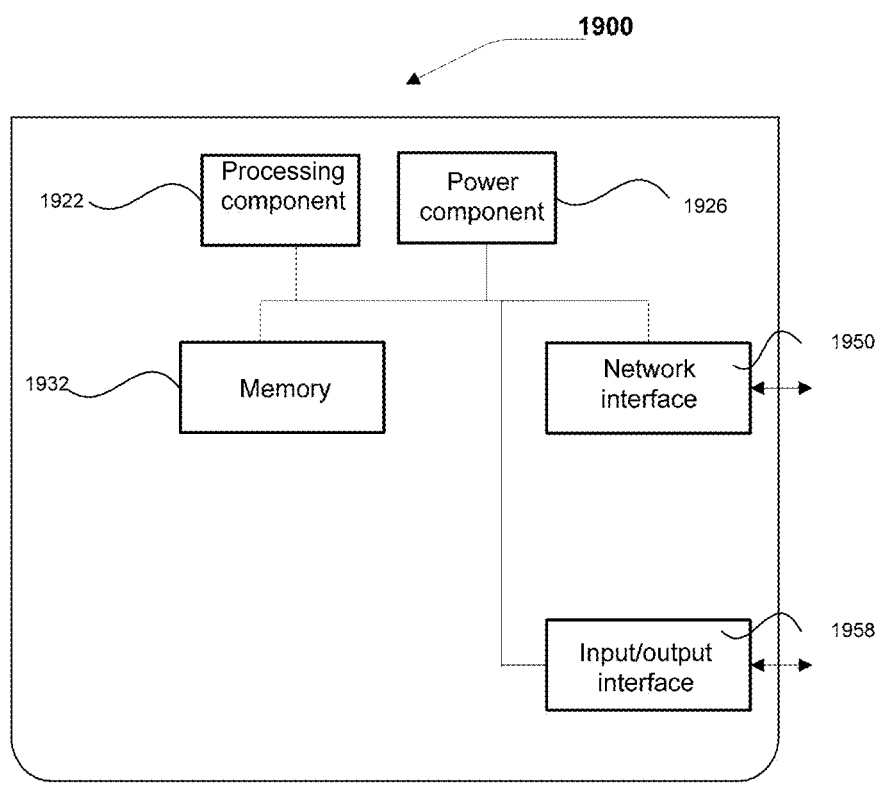
FIG. 6 shows a block diagram of an electronic apparatus according to an embodiment of the present disclosure.

FIG. 6 shows a block diagram of an electronic apparatus 1900 according to an embodiment of the present disclosure. For example, the electronic apparatus 1900 can be provided as a server. Referring to FIG. 6, the electronic apparatus 1900 includes a processing component 1922 which further includes one or more processors, and memory resources represented by a memory 1932 for storing instructions, such as application programs, that can be executed by the processing component 1922. The application programs stored in the memory 1932 may include one or more modules each corresponding to a set of instructions. In addition, the processing component 1922 is configured to execute instructions to execute the above method.

The electronic apparatus 1900 may further include a power component 1926 configured to perform power management of the electronic apparatus 1900, a wired or wireless network interface 1950 configured to connect the electronic apparatus 1900 to a network, and an input/output (I/O) interface 1958. The electronic apparatus 1900 may operate an operating system stored in the memory 1932, such as Windows Server™, Mac OS X™, Unix™, Linux™, FreeBSD™ or the like.

In an exemplary embodiment, a non-volatile computer readable storage medium is also provided, such as the memory 1932 including computer program instructions. The computer program instructions can be executed by the processing component 1922 of the electronic apparatus 1900 to complete the above methods.

The present disclosure may be a system, a method, and/or a computer program product. The computer program product may include a computer readable storage medium having computer readable program instructions for causing a processor to implement the aspects of the present disclosure stored thereon.

The computer readable storage medium may be a tangible apparatus that can retain and store instructions used by an instruction executing apparatus. The computer readable storage medium may be, but not limited to, e.g., electronic storage apparatus, magnetic storage apparatus, optical storage apparatus, electromagnetic storage apparatus, semiconductor storage apparatus, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded apparatus (for example, punch-cards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to respective computing/processing devices from a computer readable storage medium, or to an external computer or external storage device via network, for example, the Internet, local area network, wide area network and/or wireless network. The network may comprise copper transmission cables, optical fibers transmission, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium in the respective computing/processing apparatuses.

Computer readable program instructions for executing the operations of the present disclosure may be assembler instructions, instruction-set-architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" language or similar programming languages. The computer readable program instructions may be executed completely on the user's computer, partly on the user's computer, as a stand-alone software package, partly on the user's computer and partly on a remote computer, or completely on a remote computer or a server. In the scenario relating to remote computer, the remote computer may be connected to the user's computer through any type of network, including local area network (LAN) or wide area network (WAN), or connected to an external computer (for example, through the Internet connection by using an Internet Service Provider). In some embodiments, electronic circuitry, such as programmable logic circuitry, field-programmable gate arrays (FPGA), or programmable logic arrays (PLA), may be customized by using state information of the computer readable program instructions, and the electronic circuitry may execute the computer readable program instructions, so as to achieve the aspects of the present disclosure.

Aspects of the present disclosure have been described herein with reference to the flowcharts and/or the block diagrams of the methods, devices (systems), and computer program products according to the embodiments of the present disclosure. It will be appreciated that each block in the flowcharts and/or the block diagrams, and combinations of blocks in the flowcharts and/or block diagrams, can be implemented by the computer readable program instructions.

These computer readable program instructions may be provided to a processor of a general purpose computer, a dedicated computer, or other programmable data processing devices, to produce a machine, such that the instructions create means for implementing the functions/acts specified in one or more blocks in the flowcharts and/or block diagrams when executed by the processor of the computer or other programmable data processing devices. These computer readable program instructions may also be stored in a computer readable storage medium, wherein the instructions cause a computer, a programmable data processing device and/or other apparatuses to function in a particular manner, such that the computer readable storage medium having instructions stored therein comprises a product that includes instructions implementing aspects of the functions/acts specified in one or more blocks in the flowcharts and/or block diagrams.

The computer readable program instructions may also be loaded onto a computer, other programmable data processing devices, or other apparatuses to have a series of operational steps executed on the computer, other programmable devices or other apparatuses, so as to produce a computer implemented process, such that the instructions executed on the computer, other programmable devices or other apparatuses implement the functions/acts specified in one or more blocks in the flowcharts and/or block diagrams.

The flowcharts and block diagrams in the drawings illustrate the architecture, function, and operation that may be implemented by the systems, methods and computer program products according to a plurality of embodiments of the present disclosure. In this regard, each block in the flowcharts or block diagrams may represent a part of a module, a program segment, or instructions, wherein the part of a module, a program segment, or instructions comprises one or more executable instructions for implementing a specified logical function. In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagrams and/or flowcharts, and combinations of blocks in the block diagrams and/or flowcharts, can be implemented by dedicated hardware-based systems executing the specified functions or acts, or by combinations of dedicated hardware and computer instructions.

On the premise of not violating logic, different embodiments of the present disclosure can be combined with each other. Different embodiments stress different features, so please refer to descriptions of other embodiments for features that are not expounded in one embodiment.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments or the technical improvements to the arts on market, or to make the embodiments described herein understandable to one skilled in the art.

What is claimed is:

1. An image processing method, wherein the method comprises:

performing feature extraction on an image to be processed to obtain a first feature map of the image to be processed;

splitting the first feature map into a plurality of first sub-feature maps according to dimension information of the first feature map and a preset splitting rule, the dimension information of the first feature map comprising dimensions of the first feature map and size of each dimension;

performing normalization on the plurality of first sub-feature maps respectively to obtain a plurality of second sub-feature maps;

splicing the plurality of second sub-feature maps to obtain a second feature map of the image to be processed;

encoding the second feature map of the image to be processed to obtain a plurality of encoded feature maps, each of the encoded feature maps having different scales; and decoding the plurality of encoded feature maps to obtain a classification prediction result of the image to be processed.

2. The method according to claim 1, wherein splitting the first feature map into the plurality of first sub-feature maps according to the dimension information of the first feature map and the preset splitting rule comprises:

according to sizes of spatial dimensions of the first feature map and the preset splitting rule, splitting the first feature map in the spatial dimensions to obtain the plurality of first sub-feature maps.

3. The method according to claim 1, wherein performing normalization on the plurality of first sub-feature maps respectively to obtain the plurality of second sub-feature maps comprises:

grouping each first sub-feature map in a channel dimension, and performing normalization on each group of channels of the first sub-feature map to obtain a second sub-feature map of the first sub-feature map.

4. The method according to claim 1, wherein splicing the plurality of second sub-feature maps to obtain the second feature map of the image to be processed comprises:

according to positions of the plurality of first sub-feature maps in the first feature map, splicing the plurality of second sub-feature maps to obtain the second feature map of the image to be processed.

5. The method according to claim 1, wherein the splitting rule comprises at least one of the following: dimensions to be split of the feature map, a splitting position of each dimension to be split, a splitting number of each dimension to be split, a splitting size of each dimension to be split, and a number of split sub-feature maps.

6. The method according to claim 1, wherein the encoding the second feature map of the image to be processed to obtain a plurality of encoded feature maps further comprises performing scale reduction and multi-scale fusion on the second feature map of the image to be processed to obtain the plurality of encoded feature maps; and wherein the decoding the plurality of encoded feature maps to obtain a classification prediction result of the image to be processed further comprises performing scale amplification and multi-scale fusion on the plurality of encoded feature maps to obtain the classification prediction result of the image to be processed.

7. The method according to claim 6, wherein performing scale reduction processing and multi-scale fusion processing on the at least one second feature map of the image to be processed to obtain the plurality of encoded feature maps comprises:

performing scale reduction on m second feature maps to obtain m scaled-down feature maps, m being a positive integer;

performing feature fusion on the m scaled-down feature maps to obtain an (m+1)th feature map, scales of the m scaled-down feature maps being equal to that of the (m+1)th feature map; and performing feature optimization and fusion on the m second feature maps and the (m+1)th feature map respectively to obtain m+1 encoded feature maps.

8. The method according to claim 7, wherein performing scale amplification processing and multi-scale fusion processing on the plurality of encoded feature maps to obtain the classification prediction result of the image to be processed comprises:

performing fusion and scale amplification on the m+1 encoded feature maps to obtain m scaled-up feature maps, m being a positive integer; and performing feature optimization and fusion on the m scaled-up feature maps to obtain the classification prediction result of the image to be processed.

9. The method according to claim 1, wherein the method is implemented by a neural network, which comprises a feature extraction network for performing feature extraction on the image to be processed, an encoding network for performing scale reduction and multi-scale fusion on at least one second feature map of the image to be processed, and a decoding network for performing scale amplification and multi-scale fusion on a plurality of encoded feature maps.

10. The method according to claim 9, wherein the method further comprises:

training the neural network according to a preset training set, the training set comprising a plurality of labeled sample images.

11. An image processing device, comprising:

a processor; and a memory configured to store processor-executable instructions, wherein the processor is configured to invoke the instructions stored in the memory to perform operations comprising:

performing feature extraction on an image to be processed to obtain a first feature map of the image to be processed;

splitting the first feature map into a plurality of first sub-feature maps according to dimension information of the first feature map and a preset splitting rule, the dimension information of the first feature map comprising dimensions of the first feature map and size of each dimension;

performing normalization on the plurality of first sub-feature maps respectively to obtain a plurality of second sub-feature maps;

splicing the plurality of second sub-feature maps to obtain a second feature map of the image to be processed;

encoding the second feature map of the image to be processed to obtain a plurality of encoded feature maps, each of the encoded feature maps having different scales; and decoding the plurality of encoded feature maps to obtain a classification prediction result of the image to be processed.

12. The device according to claim 11, wherein splitting the first feature map into the plurality of first sub-feature maps according to the dimension information of the first feature map and the preset splitting rule comprises:
  splitting the first feature map in spatial dimensions according to sizes of the spatial dimensions of the first feature map and a preset splitting rule to obtain the plurality of first sub-feature maps.

13. The device according to claim 11, wherein performing normalization on the plurality of first sub-feature maps respectively to obtain the plurality of second sub-feature maps comprises:
  grouping each first sub-feature map in a channel dimension, and perform normalization on each group of channels of the first sub-feature map respectively to obtain a second sub-feature map of the first sub-feature map.

14. The device according to claim 11, wherein splicing the plurality of second sub-feature maps to obtain the second feature map of the image to be processed comprises:
  splicing the plurality of second sub-feature maps according to positions of the plurality of first sub-feature maps in the first feature map to obtain the second feature map of the image to be processed.

15. The device according to claim 11, wherein the splitting rule comprises at least one of the following: dimensions to be split of the feature map, a splitting position of each dimension to be split, a splitting number of each dimension to be split, a splitting size of each dimension to be split, and a number of split sub-feature maps.

16. The device according to claim 11,
  wherein the encoding the second feature map of the image to be processed to obtain a plurality of encoded feature maps further comprises performing scale reduction and multi-scale fusion on the second feature map of the image to be processed to obtain the plurality of encoded feature maps; and
  wherein the decoding the plurality of encoded feature maps to obtain a classification prediction result of the image to be processed further comprises performing scale amplification and multi-scale fusion on the plurality of encoded feature maps to obtain the classification prediction result of the image to be processed.

17. The device according to claim 16, wherein performing scale reduction and multi-scale fusion on the at least one second feature map of the image to be processed to obtain the plurality of encoded feature maps comprises:
  performing scale reduction on m second feature maps to obtain m scaled-down feature maps, m being a positive integer;
  performing feature fusion on the m scaled-down feature maps to obtain an (m+1)th feature map, scales of the m scaled-down feature maps being equal to that of the (m+1)th feature map; and
  performing feature optimization and fusion on the m second feature maps and the (m+1)th feature map respectively to obtain m+1 encoded feature maps.

18. The device according to claim 17, wherein performing scale amplification and multi-scale fusion on the plurality of encoded feature maps to obtain the classification prediction result of the image to be processed comprises:
  performing fusion and scale amplification on the m+1 encoded feature maps to obtain m scaled-up feature maps, m being a positive integer; and
  performing feature optimization and fusion on the m scaled-up feature maps to obtain the classification prediction result of the image to be processed.

19. The device according to claim 11, wherein the instructions are invoked to run a neural network so as to perform the steps.

20. A non-transitory computer readable storage medium, having computer program instructions stored thereon, wherein when the computer program instructions are executed by a processor, the processor is caused to perform operations of:
  performing feature extraction on an image to be processed to obtain a first feature map of the image to be processed;
  splitting the first feature map into a plurality of first sub-feature maps according to dimension information of the first feature map and a preset splitting rule, the dimension information of the first feature map comprising dimensions of the first feature map and size of each dimension;
  performing normalization on the plurality of first sub-feature maps respectively to obtain a plurality of second sub-feature maps;
  splicing the plurality of second sub-feature maps to obtain a second feature map of the image to be processed;
  encoding the second feature map of the image to be processed to obtain a plurality of encoded feature maps, each of the encoded feature maps having different scales; and
  decoding the plurality of encoded feature maps to obtain a classification prediction result of the image to be processed.

* * * * *